Jan. 21, 1941.  B. DICK  2,229,055
CLUTCH AND ACCELERATOR CONTROL MECHANISM
Filed April 20, 1939
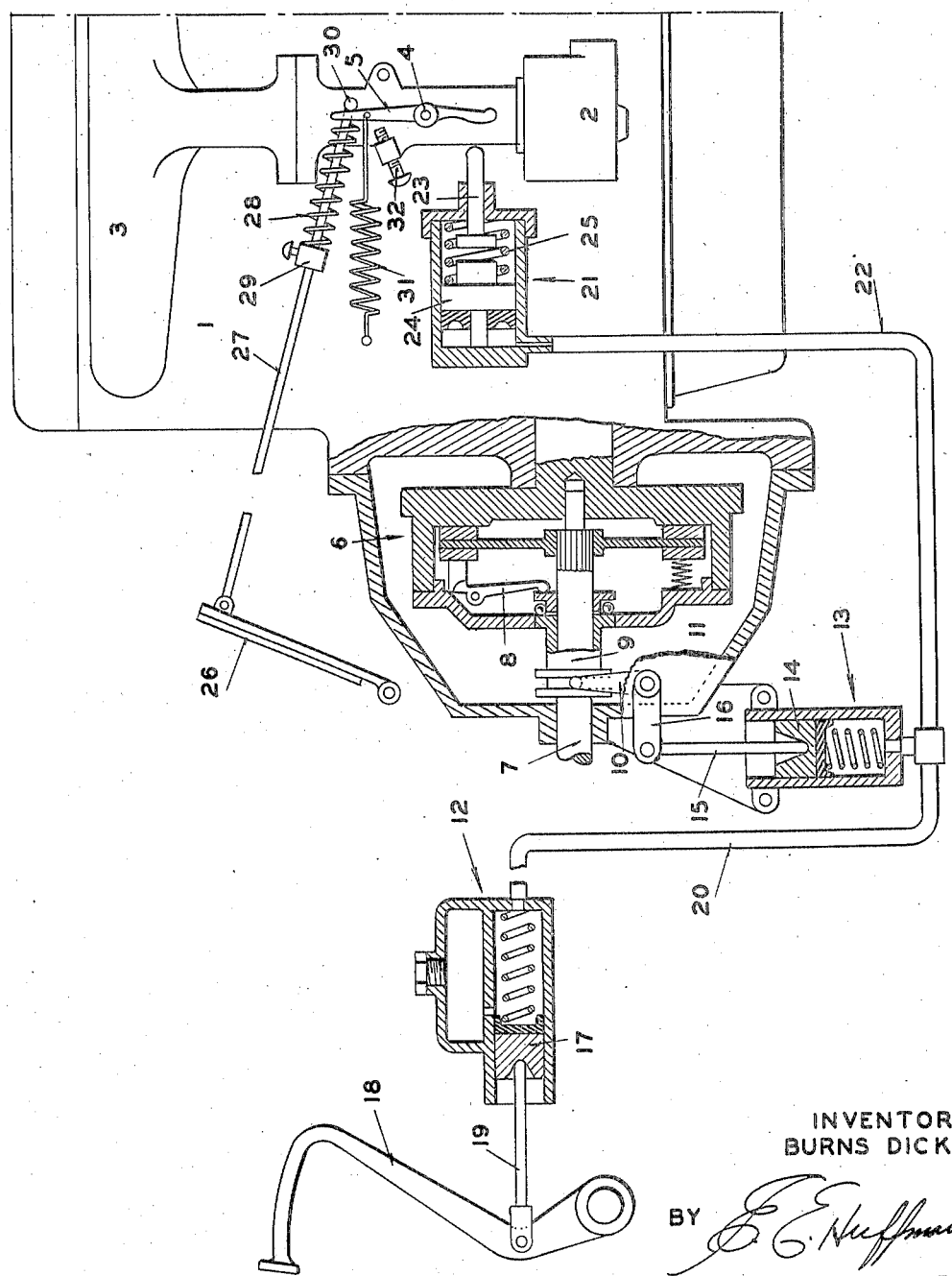
INVENTOR
BURNS DICK
BY
ATTORNEY Patented Jan. 21, 1941

2,229,055

UNITED STATES PATENT OFFICE 2,229,055

CLUTCH AND ACCELERATOR CONTROL MECHANISM

Burns Dick, Ferguson, Mo., assignor to Wagner Electric Corporation, St. Louis, Mo., a corporation of Delaware Application April 20, 1939, Serial No. 268,934

5 Claims. (Cl. 192—.01)

My invention relates to control mechanism for a motor vehicle and more particularly to the clutch operating mechanism and the accelerator mechanism of said vehicle.

In operating motor vehicles as now constructed considerable difficulty is experienced in properly coordinating the operation of the clutch mechanism and the accelerator mechanism. It is very easy for the operator to excessively "speed up" the engine prior to engagement of the clutch to start the vehicle in order to be certain of avoiding the danger of "killing" the engine. This results in unnecessary wear of the friction surfaces of the clutch and a corresponding decrease in the life of the clutch. These improper operations of the clutch and accelerator mechanisms are found to be prevalent particularly in the operation of motor vehicles which have their engines mounted remote from the operator, as for example, in the rear of the vehicle. In such vehicles the operator is unable to ascertain by sound whether or not the engine is being raced and in order to be absolutely certain that the engine will not be "killed" when the clutch is engaged, the engine is accelerated more than is necessary.

One of the objects of my invention is to provide in a motor vehicle, means associated with the clutch mechanism and the accelerator mechanism which will prevent the engine from being excessively accelerated when the clutch mechanism is in disengaged position.

Another and more specific object of my invention is to provide a fluid-operated means for preventing the throttle of an engine from being opened sufficiently to cause excessive acceleration of the engine and to so associate the means with fluid pressure actuating apparatus for a clutch mechanism that said means will be operative when the fluid pressure in the clutch actuating apparatus is sufficient to cause disengagement of the clutch mechanism.

Still another object of my invention is to provide means in the type of mechanism referred to which will permit the accelerator mechanism to be freely actuated to fully control the engine as soon as the friction surfaces of the clutch engage and transmit torque to the wheels of the vehicle.

Other objects will become apparent from the accompanying description taken in connection with the accompanying drawing in which the single figure is a schematic view of a fluid pressure control mechanism for a clutch and an accelerator mechanism of an engine showing my invention associated therewith.

Referring to the figure, numeral 1 indicates an internal combustion engine which is provided with a carburetor 2 and manifold 3 for supplying gasoline to the engine for its operation. The supply of gas for the engine is controlled by the usual valve (not shown) between the carburetor and the manifold, which valve is controlled by shaft 4 and a lever 5.

The crankshaft of the engine is connected by means of a clutch 6 to the shaft 7 which operates the wheels of the vehicle through the well-known change speed gearing and differential gearing (not shown). The throw-out levers 8 for disengaging the clutch are actuated by a sleeve 9 which has cooperating therewith a fork 10 mounted upon an operating shaft 11. The clutch is shown as being controlled by a fluid pressure system comprising a master cylinder 12 and a fluid motor 13. The piston 14 in the fluid motor is connected by means of a piston rod 15 to an arm 16 secured to the end of the control shaft 11. The piston 17 of the master cylinder 12 is actuated by a clutch pedal 18 through a connecting rod 19. A conduit 20 places the master cylinder in communication with the fluid motor 13.

In accordance with my invention, I mount a fluid motor 21 on the engine adjacent the operating lever 5 of the throttle valve and connect the fluid motor by means of the conduit 22 with the conduit 20 between the master cylinder and clutch operating fluid motor 13. The fluid motor 21 has mounted thereon a movable stop in the form of a plunger 23 for cooperation with the lower arm of lever 5. The plunger is actuated by the piston 24 in the fluid motor and is normally biased to an inoperative position by a spring 25. The plunger, when in an inoperative position, permits the throttle lever to have its usual movement to fully control the throttle valve of the engine. When plunger 23 is moved to its operative position by means of piston 24, it will assume such a position that lever 5 of the throttle can only be moved sufficiently to partially open the throttle valve.

The manual control mechanism for the throttle valve comprises an accelerator pedal 26 and a suitable connection shown as a rod 27 extending through an opening in the upper arm of the lever 5. The operating connection between the rod and the arm is a spring 28 interposed between a shoulder 29 on the rod and lever 5. The shoulder 30 on the outer end of rod 27 prevents it from becoming disengaged from the lever. Lever 5 is normally held by a spring 31 against a stop 32 and when in this position, the throttle valve is in closed position, permitting the engine to idle.

In operation, as long as the clutch is engaged, the throttle valve may be operated by the accelerator pedal in the usual manner to permit any amount of gasoline to be fed to the engine that is desired. By pushing down on pedal 26, lever 5 will be moved away from stop 32 and against the bias of the spring 31. Whenever the clutch is disengaged by moving the clutch pedal 18, fluid under pressure will be forced from the master cylinder into the fluid motor 13, thereby operating the throw-out levers of the clutch and disengaging it so that torque cannot be transmitted from the engine to the driven shaft 9. The placing of the fluid under pressure in conduit 20 also causes the fluid in conduit 22 to be placed under pressure and this will result in the actuation of piston 24 of the fluid motor 21, thereby moving said piston to the right. This will cause plunger 23 to be moved to its operative position, thereby preventing lever 5 from being operated if it is in its normally inoperative position or causing it to assume its inoperative position in the event that it is in operative position. If the latter condition is present, as a result of pedal 26 being held down, the spring 28 will be compressed. It is thus seen that whenever the clutch is disengaged, the throttle valve cannot be moved to a full open position, thereby preventing racing of the engine. This condition will prevail notwithstanding the fact that the accelerator pedal may be in a position to normally operate the throttle valve.

When the clutch pedal is released to re-engage the clutch, the pressure in conduit 20 will decrease as soon as the clutch faces come into contact. This drop in pressure in conduit 20 will also be present in conduit 22 and in fluid motor 21. The spring 25 will now be effective to move piston 24 to its inoperative position and since plunger 23 is no longer held in operative position, it can be freely moved by lever 5 of the throttle valve. The throttle valve can thus be opened and the engine speeded up to transmit torque through the clutch and move the load imposed on the driven shaft 7. It has been found desirable to permit the throttle valve to be slightly opened by the accelerator pedal whenever the plunger 23 is in its operative position. This, of course, is accomplished by so mounting the plunger that when it is in its operative position, a space will be present between the idling position of the lower arm of lever 5 and the plunger. This space, however, is not great enough to permit the throttle valve to be opened to such an extent that the engine will have an excessive speed, that is, race.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In apparatus of the class described, an engine, a throttle for controlling the speed of the engine, control mechanism for the throttle, clutch mechanism for connecting the engine to and disconnecting it from a member to be driven, fluid pressure means for controlling the clutch mechanism, a movable stop member capable of being positioned in the path of movement of an element of the throttle control mechanism, a fluid motor for actuating the stop member, and conduit means for placing the fluid motor in communication with the fluid pressure means for controlling the clutch.

2. In apparatus of the class described, an engine, a throttle for controlling the speed of the engine, manually operable means for actuating the throttle, an operative connection comprising a yieldable lost motion connection permitting said manual means to be operated without actuating the throttle when said throttle is held against movement, a movable stop for preventing movement of the throttle, clutch mechanism for connecting the engine to and disconnecting it from the member to be driven, fluid pressure means for controlling the clutch mechanism, and means operable by the fluid pressure in the clutch control mechanism when said fluid pressure means is actuated to move the clutch mechanism to disconnecting position for moving said stop to a position preventing movement of the throttle.

3. In apparatus of the class described, an engine, a throttle for controlling the speed of the engine, manually operable means for actuating the throttle, an operative connection comprising a yieldable lost motion connection permitting said manual means to be operated without actuating the throttle when said throttle is held against movement, a movable stop for preventing movement of the throttle, a fluid motor for actuating the stop, a clutch mechanism for connecting the engine to and disconnecting it from the member to be driven, fluid pressure means for controlling the clutch mechanism comprising a fluid motor and a source of pressure connected thereto, and conduit means for placing the fluid motor which actuates the stop in communication with the fluid pressure means for controlling the clutch mechanism.

4. In apparatus of the class described, an engine, a throttle lever for controlling the speed of the engine, control mechanism for the throttle lever comprising a manually operated member connected to the throttle lever by spring means which will yield to permit the manual member to be operated without actuating the throttle lever if said lever is held from movement, means for controlling the transmission of power from the engine to a member to be driven, fluid pressure operated means for causing said means to be inoperable, other fluid pressure operated means cooperating with the throttle lever to thereby prevent it from assuming substantially full throttle open position notwithstanding the control mechanism may be positioned so as to normally place the throttle lever in said position, and means for placing the two fluid pressure operated means in constant communication with each other so that the latter will be operated by fluid under pressure when the former is operated by fluid under pressure to cause the power transmission controlling means to be inoperable.

5. In apparatus of the class described, an engine, a throttle for controlling the speed of the engine, control mechanism for the throttle, clutch mechanism for connecting the engine to and disconnecting it from a member to be driven, hydraulic pressure operated means for placing the clutch mechanism in disconnecting condition and comprising a master cylinder device, a motor and a connecting conduit, means comprising a second motor for positively preventing the throttle controlled mechanism from moving the throttle to or maintaining it in substantially full open position, and conduit means for placing the second motor in a constant communication with the hydraulic pressure operated means for disengaging the clutch mechanism whereby said second motor will be operated when the clutch is disengaged by operation of the master cylinder device.

BURNS DICK.